United States Patent [19]
Steinkaemper et al.

[11] Patent Number: 5,725,033
[45] Date of Patent: Mar. 10, 1998

[54] FILLING SYSTEM FOR ROBOT-CAPABLE FILLING OF A VEHICLE WITH FUEL

[75] Inventors: Reinhard Steinkaemper, Winnenden; Adolf Kremer, Remseck; Ronald Schmid, Ohmden; Andreas Fischer, Reichenbach; Andreas Mueller, Stuttgart, all of Germany

[73] Assignee: Mercedes-Benz AG, Stuttgart, Germany

[21] Appl. No.: 706,560

[22] Filed: Sep. 5, 1996

[30] Foreign Application Priority Data

Sep. 5, 1995 [DE] Germany ............... 195 32 775.6

[51] Int. Cl.$^6$ ............... B65B 1/04; B60K 15/05
[52] U.S. Cl. ............... 141/346; 141/312; 141/349; 141/368; 141/392; 220/86.2; 220/336; 220/DIG. 33; 251/250.5; 251/149.8; 251/149.9
[58] Field of Search ............... 141/98, 291, 292, 141/312, 346, 348–350, 367, 368, 383, 384, 388, 389, 392, 94; 220/202, 86.2, 336, 288, 291, 292, DIG. 33; 251/162, 250.5, 351, 352, 149.8, 149.9; 901/6

[56] References Cited

U.S. PATENT DOCUMENTS 5,435,358 7/1995 Kempka et al. ............... 141/312
5,609,190 3/1997 Anderson et al. ............... 141/392

FOREIGN PATENT DOCUMENTS 0 612 639 8/1994 European Pat. Off. .

Primary Examiner—Henry J. Recla
Assistant Examiner—Steven O. Douglas
Attorney, Agent, or Firm—Evenson, McKeown, Edwards & Lenahan, P.L.L.C.

[57] ABSTRACT

A filling system for robot-capable filling of a motor vehicle with fuel has a filler nozzle and a tank filler neck, with a docking extension provided with a central opening being provided on the neck on the filling side of the vehicle. The extension is rotatable by an upper section around the axis of symmetry to open and close a tank closure. The filler nozzle is dockable by its outlet end to form a positive connection between the filler nozzle and the docking extension. When the filler nozzle is ready for filling, positive elements distributed around the circumference of the filler nozzle and the docking extension mesh positively with one another. In order to achieve a simple docking of the filler nozzle on the filler neck of the vehicle fuel tank for a filling that is always functionally reliable and unimpeded, the positive elements of one docking partner are radially movable and actuatable in the radial direction fluidically, and the positive elements of the other docking partner are rigid. In the former, the movable positive elements are lockable in a locked position that acts in the circumferential direction and produces axial locking. The elements are completely retracted into the docking partner on which they are mounted in the unlocked position of the docking partner.

12 Claims, 4 Drawing Sheets 5,725,033

FILLING SYSTEM FOR ROBOT-CAPABLE FILLING OF A VEHICLE WITH FUEL

BACKGROUND AND SUMMARY OF THE INVENTION

The invention relates to a filling system and, more particularly, to a filling system for a robot-capable filling of a motor vehicle with fuel. The filling system has a filler nozzle and a tank filler neck. A docking extension is provided with a central opening and is mounted on the neck on the filling side of the vehicle. The extension is rotatable by an upper section around an axis of symmetry for opening and closing a tank closure. The filler nozzle is dockable via an outlet end to form a positive connection between the filler nozzle and the docking extension. Positive elements distributed around a circumference of the outlet end and docking extension in the manner of teeth of a hub section mesh with one another positively when the filler nozzle is ready for filling.

A filling system of the above-mentioned type is known from European patent document EP 0 612 639 A1. This patent document includes a robot-guided filling nozzle and a docking extension mounted on a closure for the tank filler neck of a motor vehicle. The extension is made in the form of a hollow cylinder and has internal teeth into which external teeth provided circumferentially on the outlet end of the filler tube of the filler nozzle can engage positively when docking, so that the closure can be opened by turning the docking extension via the filler nozzle to ensure slip-proof retention of the filler nozzle on the motor vehicle in the docked state. Such docking is only possible however if the filler nozzle is precisely guided so that its teeth occupy exactly the correct angular position relative to the teeth of the docking extension. This is possible only with a very costly and very cumbersome sensing system and a highly precise control associated therewith for the filler nozzle. In the absence of such a sensing system and control, the probability is high that the teeth on the filler nozzle of the filling robot will not enter the gaps in the teeth of the docking extension during the docking process but instead will collide with the teeth of the extension. The robot, which cannot recognize the incorrect position without suitable additional sensing systems, then continues pushing the filler nozzle against the filler neck, which can result in damage to the filler neck and can push the vehicle away. Although the probability of this occurring, namely a collision between the tooth tips, can be minimized by providing very fine pointed teeth on both parts, such teeth are sensitive to contamination and prone to problems as a result of wear. In addition, if a vehicle occupant leaves the vehicle during the filling process, rocking movements occur in the vehicle that lead to a separation of the two sets of teeth, thus interrupting the filling process abruptly and inadvertently, and possibly causing fuel to flow freely into the environment from the filler nozzle.

The goal of the invention is to provide an improved filling system such that simple docking of the filler nozzle with the filler neck of the vehicle fuel tank for filling is achieved while said system is functionally reliable and unimpeded at all times.

The goal is achieved according to the present invention by a filling system for a robot-capable filling of a motor vehicle with fuel. The filling system has a filler nozzle and a tank filler neck. A docking extension is provided with a central opening and is mounted on the neck on the filling side of the vehicle. The extension is rotatable by an upper section around an axis of symmetry for opening and closing a tank closure. The filler nozzle is dockable via an outlet end to form a positive connection between the filler nozzle and the docking extension. Positive elements distributed around a circumference of the outlet end and docking extension in the manner of teeth of a hub section mesh with one another positively when the filler nozzle is ready for filling. Radially movable positive elements are mounted on one of the docking partners and are operable fluidically in the radial direction. The positive elements of the other docking partner are made rigid. The movable positive elements, which in the unlocked state of the two docking partners are completely retracted into their docking partners, are lockable in a latching position that has a locking action in the circumferential and axial directions.

As an advantage of the invention, the positive connection between the filler nozzle and the filler neck that is required for pivoting the sealing cap of the filler neck is accomplished by radially deployable positive elements instead of teeth. These elements positively engage matching positive elements on the filler nozzle and/or the docking extension in the docking position, so that in the event of an initially incorrect position of the radially adjustable positive elements relative to the rigidly mounted positive elements, with no positive engagement, a slight rotation around the axis of the body itself will suffice to reach the locking position and hence the safe coupling position. The slight twisting effort is especially favorable with respect to a robot-guided filler nozzle having fuel hoses attached to it, in that twisting of the filler nozzle is largely prevented that would otherwise lead to considerable functional problems during filling as a result of possible kinking of the fuel hoses. Contamination of the docking extension, or on the filler nozzle, no longer prevents docking, since the radially adjustable positive elements engage the rigid matching positive elements only when the docking position of the filler nozzle in the docking extension has been reached and radial actuation of the adjustable positive elements is performed by a fluid that urges them. Otherwise, they are fully retracted into the docking partner on which they are mounted. Since the pressure of the fluid and hence the forces acting on the positive elements are limited, the filler nozzle cannot jam in the docking extension if the positive elements of the two docking partners are improperly positioned relative to one another. Thus, in relatively simple fashion, an unimpeded docking that proceeds independently of the relative angular positions of the filler nozzle and filler neck is made possible. As a result of the locking of the filler nozzle on the filler neck in the axial and circumferential directions in the locking position, undesired axial uncoupling of the filler nozzle and filler neck during rocking movements of the motor vehicle is prevented at the same time and functionally reliable coupling is thus achieved.

It is also advantageous for functionally reliable and unimpeded coupling to take place in a simple fashion without any aids engaging from the outside, simply as a result of radial fluid pressurization of the adjustable positive elements in the docking position of the filler nozzle.

In addition, the invention offers a compact solution for a filling system in which a plurality of mechanical components are eliminated which are otherwise required for mechanical actuation of the movable positive elements, especially within the filler nozzle, and therefore constrict its filling channel, and in which structurally constricted conditions already prevail in the tank cavity.

Other objects, advantages and novel features of the present invention will become apparent from the following detailed description of the invention when considered in conjunction with the accompanying drawings.

DETAILED DESCRIPTION OF THE DRAWINGS

Figure 1:
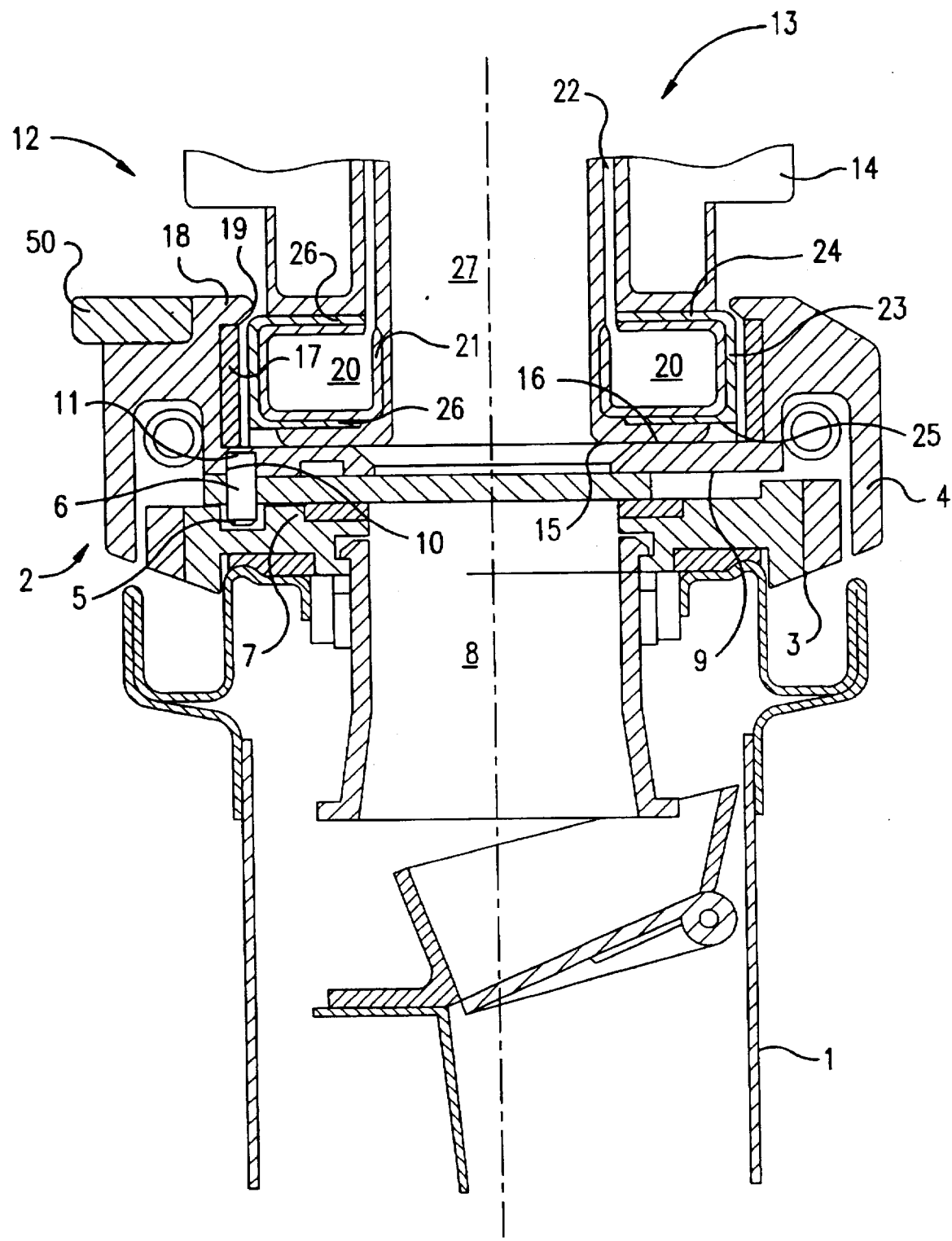
FIG. 1 shows parts of the filling system according to the invention in a lateral lengthwise, section with the positive elements in the engaged position, with an elastomer hose provided at the lower end of the filler nozzle and toothed segments associated therewith, and with circumferential internal teeth on the docking extension.

FIG. 1 shows a filler neck 1 of a fuel tank of a motor vehicle. The neck 1 is sealed by a cap 2 screwed onto it with a bayonet type of connection. Cap 2 consists essentially of two annular bodies 3, 4. The cap 2 is screwed by annular body 3 onto filler neck 1. A vertically disposed rotational axis is provided at the top of annular body 3 (not visible in the drawing) for a horizontally pivotable swivel slide 7 permanently connected with the axis. The slide 7 closes a central inlet channel 8 of the annular body 3 in a sealing fashion. Annular body 4 is mounted on top of annular body 3 to rotate around the axis of the body itself and has a receptacle 10 on its underside 9 near an edge. An upper end 11 of a drive pin 6 for swivel slide 7 engages the receptacle with a press fit. By rotation of annular body 4, drive pin 6 moves swivel slide 7 in the circumferential direction from an open into a closed position and vice versa, depending on the direction of rotation of annular body 4. The drive pin 6 is guided inside a radial guide path 5 machined in swivel slide 7. The pin 6 slides at the top of annular body 3 on the path 5 in the shape of an arc of a circle.

At the top of the annular body 4, there is a coaxial hollow cylindrical docking extension 12. A filler nozzle 13 of a filling robot, with an end 14 on the outlet side referred to hereinbelow as the "end effector," enters the extension for filling. The end effector 14 abuts, with its end 15, the top 16 of the annular body 4 in the docking position. In the internal circumference of docking extension 12, circumferential teeth 17 with a low pitch modulus are provided. The teeth 17 are covered by a bead 18 formed endwise on docking extension 12 and projecting radially inward. Bead 18 is beveled on its side 19 facing the teeth 17.

A circumferential annular groove 20 is machined into the end effector 14 near its end 15, in which groove an annular elastomer hose 21 is fastened. Elastomer hose 21 is connected at the top to an annular fluid channel 22 that runs axially in the end effector 14 and is connected with a pressure source at the other end. Elastomer hose 21 is elastically expandable by the fluid under pressure, which can be a liquid or a gas. The hose 21 forms the actuating element for a matching positive element in the form of a toothed segment 23 in the shape of an arc of a circle which matches the teeth 17.

Toothed segment 23 has a U-shape, which, with its legs 24 and 25, fits around elastomer hose 21 at its top and bottom like a clamp. The legs 24, 25 are then guided radially in circumferential recesses 26 delimited at the top and bottom by the elastomer hose 21 and the annular groove 20. It is also possible to provide any other arrangement of toothed segment 23 on end effector 14 and to have any other kind of design. However, assurance must be provided that the toothed segment 23 is mounted relative to the hose 21 in such fashion that it can be pressed against the teeth 17 of docking extension 12 as a result of the expansion of the hose 21 due to pressure.

Figure 2:
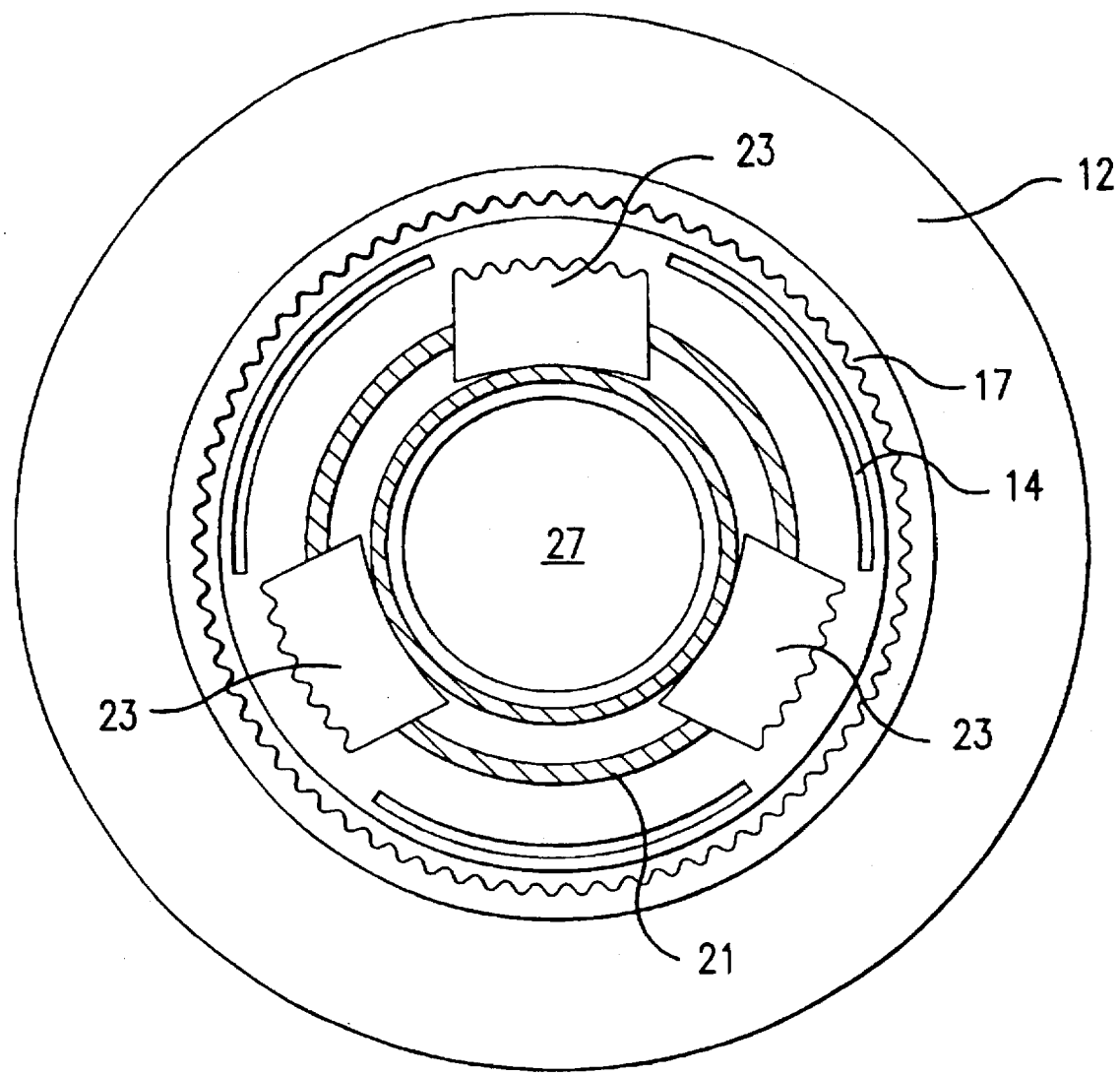
FIG. 2 is a top view of a cross section of the system in FIG. 1 with the filler nozzle in the docking position and with the toothed segments not activated.

As can be seen in FIG. 2, three toothed segments 23 are arranged symmetrically relative to one another in the circumferential direction on the elastomer hose 21. End effector 14 is shown docked, but without the toothed segments 23 yet engaging the teeth 17 of docking extension 12. Instead, they are completely retracted in the end effector 14, so that no jamming of the teeth can occur during docking.

As a result of subjecting the hose 21 to pressure, the toothed segments 23 are deployed radially outward and engage the teeth 17. Thus a positive fit between teeth 17 and toothed segments 23 is achieved and the filler nozzle 13 is locked in the circumferential direction. Then filling can be initiated through a filling tube guided through a central opening 27 in the end effector 14 after opening the swivel slide 7 by rotating the upper annular body 4 by twisting the filler nozzle 13. The pitch modulus of positive elements 17 and 23, whose teeth match one another, is so low and the teeth are so numerous that in the event of the tooth tips of the two sets of teeth striking one another, only minimal rotation of filler nozzle 13 or of end effector 14 is sufficient to cause the teeth to mesh with one another.

Axial locking of filler nozzle 13 is effected by the circumferential bead 18 which forms a stop at the top for the radially deployed toothed segments 23. By beveling its side 19 facing teeth 17 and, in the engaged position, toothed segments 23 as well, the filler nozzle 13 can quickly slide out of the docking extension 12 in an emergency undocking maneuver after overcoming a certain axial retaining force that depends on the angle of the bevel. It should be noted in this connection that the pressure of the working medium, in other words the fluid, is controlled so that in the event of an emergency undocking when the axial retaining force is exceeded, the radial deflection of toothed segment 23 or compression of elastomer hose 21 is possible within certain limits without jamming. Normal undocking consists in reducing the pressure in hose 21 so that toothed segments 23 again retract completely into end effector 14.

Figure 3:
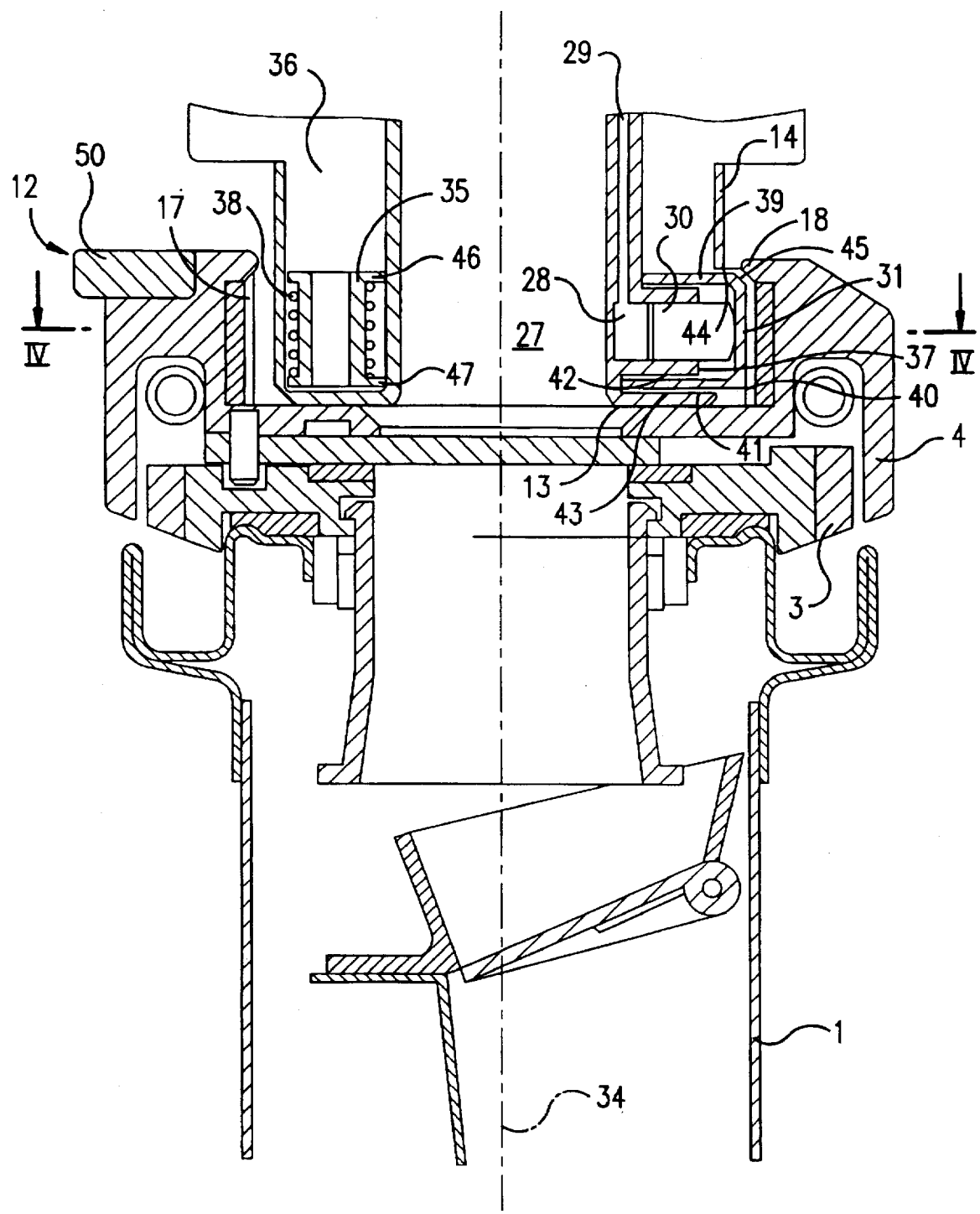
FIG. 3 shows parts of the system according to an alternate embodiment of the invention in the docking position in a lateral lengthwise section, with the filler nozzle ready for filling, with pawls bearing toothed segments mounted on said nozzle, said pawls being actuated fluidically.
Figure 4:
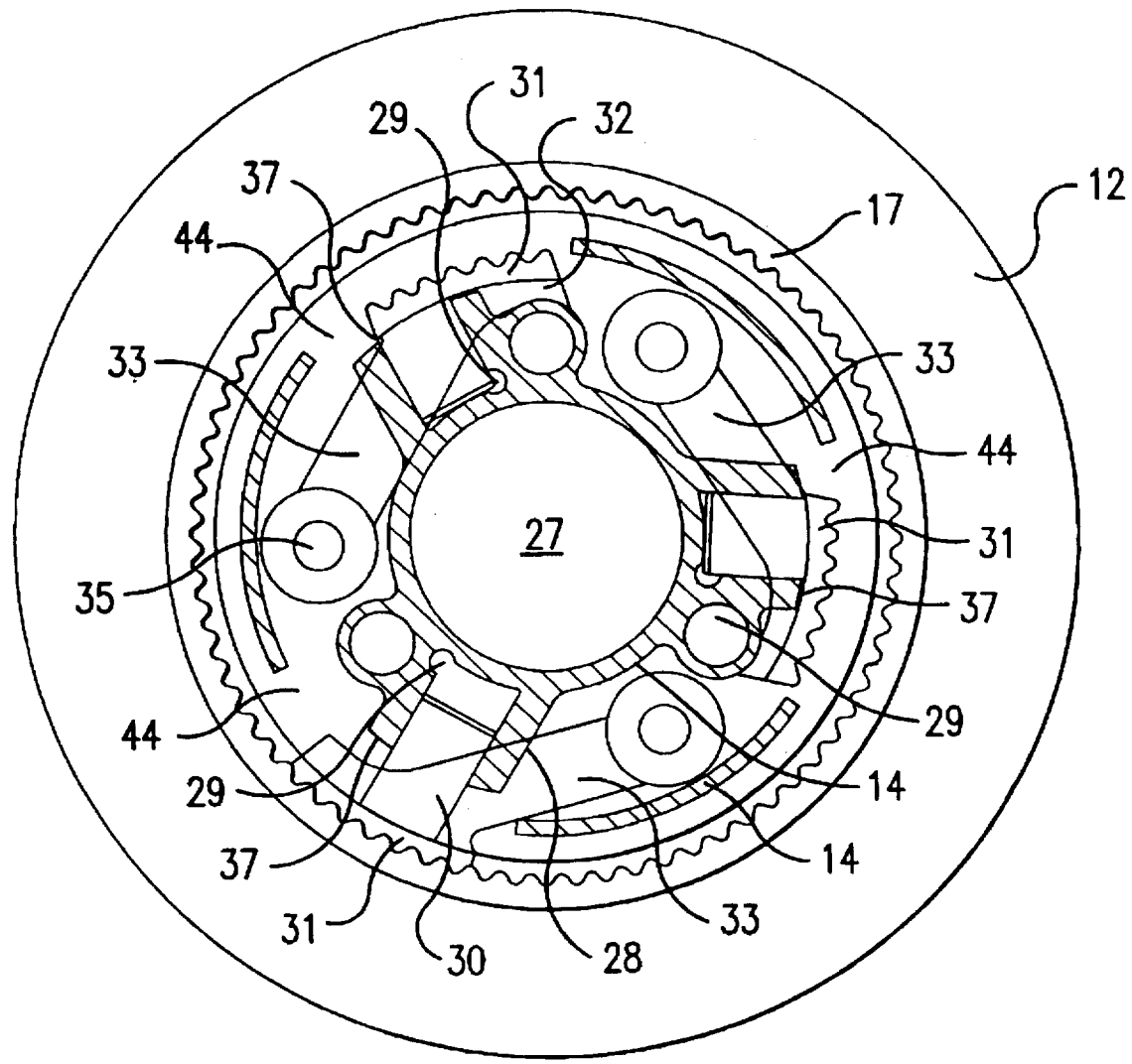
FIG. 4 is a top view of a cross section of the system shown in FIG. 3 in a section taken along line IV—IV.

Another embodiment of the invention is shown in FIGS. 3 and 4. In contrast to the first embodiment, three radially directed working cylinders 28 are provided on end effector 14 near its end 15. The cylinders 28 are retracted completely into the effector and arranged symmetrically relative to one another in the circumferential direction. The cylinders are joined at the back by a fluid channel 29 and are made open at the front.

A working piston 30 is guided in working cylinder 28. The piston 30 forms the actuating element for a toothed segment 31 having teeth with a small pitch modulus. The piston 30 is mounted on a free end 32 of a pawl 33. Pawl 33 is pivotable at an angle to the docking direction around a rotational axis 35 that is parallel to axis 34 of the filler neck. Toothed segment 31 can thus be urged internally by working piston 30 as a result of fluid pressure. The pawl 33 is rotatably mounted about the rotational axis 35 immediately above an end 15 of the end effector within an axial recess 36 formed near the edge in the end effector 14. Pawl 33, consisting of two parallel spaced bars 46 and 47 fastened to the rotational axis 35 and also to the toothed segment 31, operates in conjunction with the toothed segment 32 to engage the working cylinder 28 associated with it at the top and bottom. The toothed segment 31 abuts an edge 37 of the opening of working cylinder 28 in the unactuated position of the toothed segment 31. Pawl 33 is then urged by a pretensioned leg spring 38 that surrounds the rotational axis 35 of the pawl 33, and abuts the latter, pressing the toothed segment 31 so that it abuts the edge 37 of the working cylinder 28.

Toothed segment 31 is made U-shaped and surrounds with some play the working cylinder 28 with its legs 39, 40. Lower leg 40 is then guided with play in a radial gap 41 between the underside 42 of working cylinder 28 and a wall section 43 containing the end 15 of the end effector 14. Upper leg 39 is fastened to bar 46 and lower leg 40 is fastened to bar 47 of pawl 33. The end effector 14 has openings 44 on its circumference that allow the toothed segments 31, which are completely retracted into end effector 14 in the unactuated position, to pivot outward.

Rotational axes 35 of pawls 33 are likewise symmetrical in the circumferential direction and are so arranged that they are located diametrally opposite a working cylinder 28 relative to central opening 27 of the end effector. The cylinder is associated with another pawl 33. In order to press toothed segments 31 against teeth 17 of docking extension 12 and thus produce a locked position of the docking partners, the relative position of the rotational axis 35 in end effector 14 and the lengths of the pawls as well as the position of edge 37 of the opening of working cylinder 28 must be such that the pivot angle is uniformly in the range of between 5° and 20° for all of the pawls 33 provided.

The fluid forces acting on the working pistons 30 can be kept very low since, as a result of the design, when the end effector 14 or filler nozzle 13 is rotated, a torque is created around pawl axis 35 that forces the toothed segments outward against teeth 17 and thus reinforces the pivoting motion produced by the fluid pressure. Docking and undocking take place accordingly, as in the first embodiment shown in FIGS. 1 and 2, with pawls 33 being pivoted radially around rotational axis 35 when an actuating pressure is applied through fluid channels 29. Thus, by creating pressure in certain working cylinders 28, individual toothed segments 31 can be actuated selectively (FIG. 4). As a result of the low pitch modulus of teeth 31 and 17, the amount of wasted motion before the teeth mesh with one another is very small and thus the torsional stress on the filler nozzle 13 and the fuel hoses connected thereto is very small.

For emergency undocking, toothed segments 31 also have a bevel 45 at the top by which they abut a surrounding bead 18 that locks the filler nozzle 13 axially in the locked position, and can slide out of the teeth 17 without jamming when an axial retaining force is exceeded. In the first embodiment and here as well, the bead 18 can be located circumferentially on the end effector 14 in the vicinity of its end, with the bead 18 fitting under rather than over the teeth 17, so that filler nozzle 13 is also locked axially on docking extension 12. The bevels of bead 18 and teeth 17 must match one another to permit emergency undocking. Normal undocking takes place with pawls 33 being relieved of pressure by eliminating the fluid pressure, so that the leg springs 38, with no fluid force opposing them, can pivot pawls 33 and hence toothed segments 31 back into their retracted positions inside end effector 14.

For manually opening and closing cap 2, a loop 50 is integrated into docking extension 12 along its circumference and near its end. The loop is pivotable around an axis that runs transversely relative to the docking direction so that by pivoting loop 45 through 90°, an operating position, possibly a locked position, is reached in which the cap 2 can be opened simply by turning loop 50 in the circumferential direction. Loop 50 is spring-loaded, with the spring pulling loop 50 in the direction of its non-operating position at the circumference of docking extension 12.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A filling system for automated filling of a motor vehicle with fuel, comprising:

a filler nozzle;

a tank filler neck of the motor vehicle;

a docking extension provided with a central opening mounted on said filler neck, said docking extension having an upper section which rotates said docking extension around an axis of symmetry for opening and closing a tank of said motor vehicle;

wherein said filler nozzle has an outlet end forming an end effector which docks said filler nozzle with a positive connection between said filler nozzle and said docking extension, positive locking elements being distributed around a circumference of said outlet end and said docking extension in a tooth-like manner so as mesh with one another when said filler nozzle is in a filling state;

wherein said docking extension and said filler nozzle form docking partners, radially movable ones of said positive elements being mounted on one of said docking partners, and being operable fluidically in a radial direction;

wherein rigid ones of said positive elements are mounted on the other of said docking partners; and wherein said radially movable positive elements are completely retracted into their respective docking partner and are lockable in a circumferential direction and an axial direction in a latching position via a locking action.

2. The system according to claim 1, wherein said rigid positive elements of the respective docking partner are formed of multiple circumferential teeth having a small pitch modulus; and wherein said positive elements of the other docking partner include toothed segments in a circular arc shape having teeth which match and mesh with said circumferential teeth.

3. The system according to claim 2, wherein said toothed segments are provided at a free end of a respective pawl, said pawl being pivotable transversely relative to a docking direction around a rotational axis arranged parallel to an axis of said filler neck.

4. The system according to claim 3, wherein the actuating element for said pawl is a working piston guided in a working cylinder aligned radially and open toward said matching teeth of said other docking partner, by which working piston said toothed segment is internally urged radially outward.

5. The system according to claim 4, wherein said working cylinder is connected at a rear end to a fluid channel connected with a pressure source.

6. The system according to claim 4, wherein said toothed segment abuts an edge of an opening of said working cylinder in an unactuated position under spring tension applied by a pretensioned leg spring mounted around said rotational axis of said pawl.

7. The system according to claim 6, wherein a relative position of said rotational axis and a dimension of said pawl length, as well as a position of said edge of the opening of said working cylinder are provided such that a pivot angle required to reach a locked position of said toothed segment with said matching teeth of the other docking partner uniformly is within a range from about 5° to 20° for all pawls provided.

8. The filling system according to claim 1, wherein said radially movable positive elements are displaceable by a fluidically drivable, radially acting actuating element toward said rigid positive elements.

9. The system according to claim 8, wherein said actuating element comprises an annular elastomer hose mounted on one of said docking partners, said hose being elastically expandable via a fluid channel connected with a pressure source; and wherein said radially movable positive elements are arranged relative to said hose such that they are pressed against said rigid positive elements of the respective other docking partner when said hose is expanded via said pressure source.

10. The system according to claim 9, wherein said elastomer hose is arranged in a circumferential annular groove on said one docking partner; and wherein said radially movable positive elements grip said elastomer hose via legs in a clamp like manner above and below said hose, said legs being guided radially in annular recesses delimited above and below said hose and said annular groove.

11. The system according to claim 1, wherein a radially projecting beveled bead is provided on an end of said docking partner containing said rigid positive elements, said bead fitting radially behind said radially movable positive elements of the other docking partner in a locked position of said filler nozzle to provide an axial lock.

12. The system according to claim 1, further comprising a loop integrated along a circumference of said docking extension, said loop being pivotable by 90° for manually opening and closing said fuel tank.

* * * * *